United States Patent
Kosaka

(10) Patent No.: US 7,443,926 B2
(45) Date of Patent: Oct. 28, 2008

(54) APPARATUS FOR INPUTTING CLOCK SIGNAL AND DATA SIGNALS OF SMALL AMPLITUDE LEVEL WITH START TIMING OF INPUTTING CLOCK SIGNAL AHEAD OF THAT OF INPUTTING DATA SIGNALS

(75) Inventor: Yasuhiro Kosaka, Shiga (JP)

(73) Assignee: NEC Electronics Corporation, Kanagawa (JP)

( * ) Notice: Subject to any disclaimer, the term of this patent is extended or adjusted under 35 U.S.C. 154(b) by 618 days.

(21) Appl. No.: 11/126,327

(22) Filed: May 11, 2005

(65) Prior Publication Data

US 2006/0120485 A1 Jun. 8, 2006

(30) Foreign Application Priority Data

May 12, 2004 (JP) ............................. 2004-141946

(51) Int. Cl.
H04L 27/00 (2006.01)
(52) U.S. Cl. ...................................... 375/316
(58) Field of Classification Search ................ 375/257, 375/316, 318–319, 377; 345/87, 90, 604
See application file for complete search history.

(56) References Cited

U.S. PATENT DOCUMENTS

| | | | | |
|---|---|---|---|---|
| 6,097,362 A | * | 8/2000 | Kim | ............................. 345/87 |
| 6,166,720 A | * | 12/2000 | Sim | ............................. 345/604 |
| 2002/0097208 A1 | * | 7/2002 | Hashimoto | .................... 345/87 |
| 2003/0043129 A1 | * | 3/2003 | Tazuke | ......................... 345/204 |
| 2005/0146493 A1 | * | 7/2005 | Kinjo et al. | .................... 345/89 |

FOREIGN PATENT DOCUMENTS

JP 11-249626 9/1999

* cited by examiner

Primary Examiner—Khanh C Tran
(74) Attorney, Agent, or Firm—Foley & Lardner LLP

(57) ABSTRACT

In an apparatus including a shift register adapted to pass a start signal therethrough in synchronization with a clock signal of a large amplitude level to sequentially generate a plurality of latch signals, a data register adapted to latch sequential data signals of the large amplitude level in synchronization with the latch signals, and a data latch circuit adapted to latch all the sequential data signals latched in the data register in synchronization with a strobe signal, a receiver converts differential clock signals of a small amplitude level into the clock signal of the large amplitude level from a timing of generation of the strobe signal to a timing of completion of latching all the sequential data signals in the data register, and transmits the clock signal of the large amplitude level to the shift register, and also, converts differential data signals of the small amplitude level into the sequential data signals from a timing of generation of the start signal to the timing of completion of latching all the sequential data signals in the data register and transmits the sequential data signals to the data register.

7 Claims, 6 Drawing Sheets

APPARATUS FOR INPUTTING CLOCK SIGNAL AND DATA SIGNALS OF SMALL AMPLITUDE LEVEL WITH START TIMING OF INPUTTING CLOCK SIGNAL AHEAD OF THAT OF INPUTTING DATA SIGNALS

BACKGROUND OF THE INVENTION

1. Field of the Invention

The present invention relates to an apparatus for inputting a clock signal and data signals of a small amplitude level such as a data line driver of a liquid crystal display (LCD) apparatus.

2. Description of the Related Art

Generally, an LCD apparatus is constructed by an LCD panel having data lines (or signal lines), scan lines (or gate lines) and liquid crystal cells each located at one intersection between the data lines and the scan lines, a plurality of data line drivers provided at a horizontal edge of the LCD panel and connected by a cascade connection to each other for driving the data lines, and a plurality of scan line drivers provided at a vertical edge of the LCD panel and connected by a cascade connection to each other to drive the scan lines.

In an extended graphics array (XGA) formed by 1024×3× 768 dots, eight data line drivers each for driving 384 (=128×3) data lines are provided. In this case, use is made of a low speed CMOS interface or a low speed large amplitude interface between modules of the drivers and their controller using a clock frequency of about 60 MHz.

On the other hand, in a super extended graphics array (SXGA) formed by 1280×3×1024 dots, ten data line drivers each for driving 384 (=128×3) data lines are provided. Also, in an ultra extended graphics array (UXGA) formed by 1600× 3×1200 dots, sixteen data line drivers each for driving 300 (=100×3) data lines are provided. In both of these cases, although use is made of a high speed CMOS interface, such a high speed CMOS interface needs to adopt a parallel transmission system in order to avoid electro magnetic interference (EMI) noise, which, however, increases the number of connections. Therefore, use is now made of a high speed small amplitude interface between modules of the drivers and their controller using a clock frequency of higher than 60 MHz.

In the SXGA or UXGA using the above-mentioned high speed small amplitude interface, a receiver formed by a clock signal receiver (differential amplifier) and data signal receivers (differential amplifiers) are required. Also, in order to decrease the power consumption, the clock signal receiver and the data signal receivers are both activated only from a timing of generation of a start signal to a timing of completion of latching all data signals (see; JP-11-249626).

In the above-described prior art, however, since the restoration of the data signal receivers from a deactivation state to an activation state requires a certain time, the clock signal receiver needs to be activated sufficiently before the activation of the data signal receivers. For simply realizing this, the clock receiver was always activated. This increases the power consumption.

SUMMARY OF THE INVENTION

It is an object of the present invention to provide an apparatus for inputting a clock signal and data signals of a small amplitude level without increasing the power consumption.

According to the present invention, in an apparatus including a shift register adapted to pass a start signal therethrough in synchronization with a clock signal of a large amplitude level to sequentially generate a plurality of latch signals, a data register adapted to latch sequential data signals of the large amplitude level in synchronization with the latch signals, and a data latch circuit adapted to latch all the sequential data signals latched in the data register in synchronization with a strobe signal, a receiver converts differential clock signals of a small amplitude level into the clock signal of the large amplitude level from a timing of generation of the strobe signal to a timing of completion of latching all the sequential data signals in the data register, and transmits the clock signal of the large amplitude level to the shift register, and also, converts differential data signals of the small amplitude level into the sequential data signals from a timing of generation of the start signal to the timing of completion of latching all the sequential data signals in the data register and transmits the sequential data signals to the data register.

BRIEF DESCRIPTION OF THE DRAWINGS

The present invention will be more clearly understood from the description set forth below, with reference to the accompanying drawings, wherein.

DESCRIPTION OF THE PREFERRED EMBODIMENT

Figure 1:
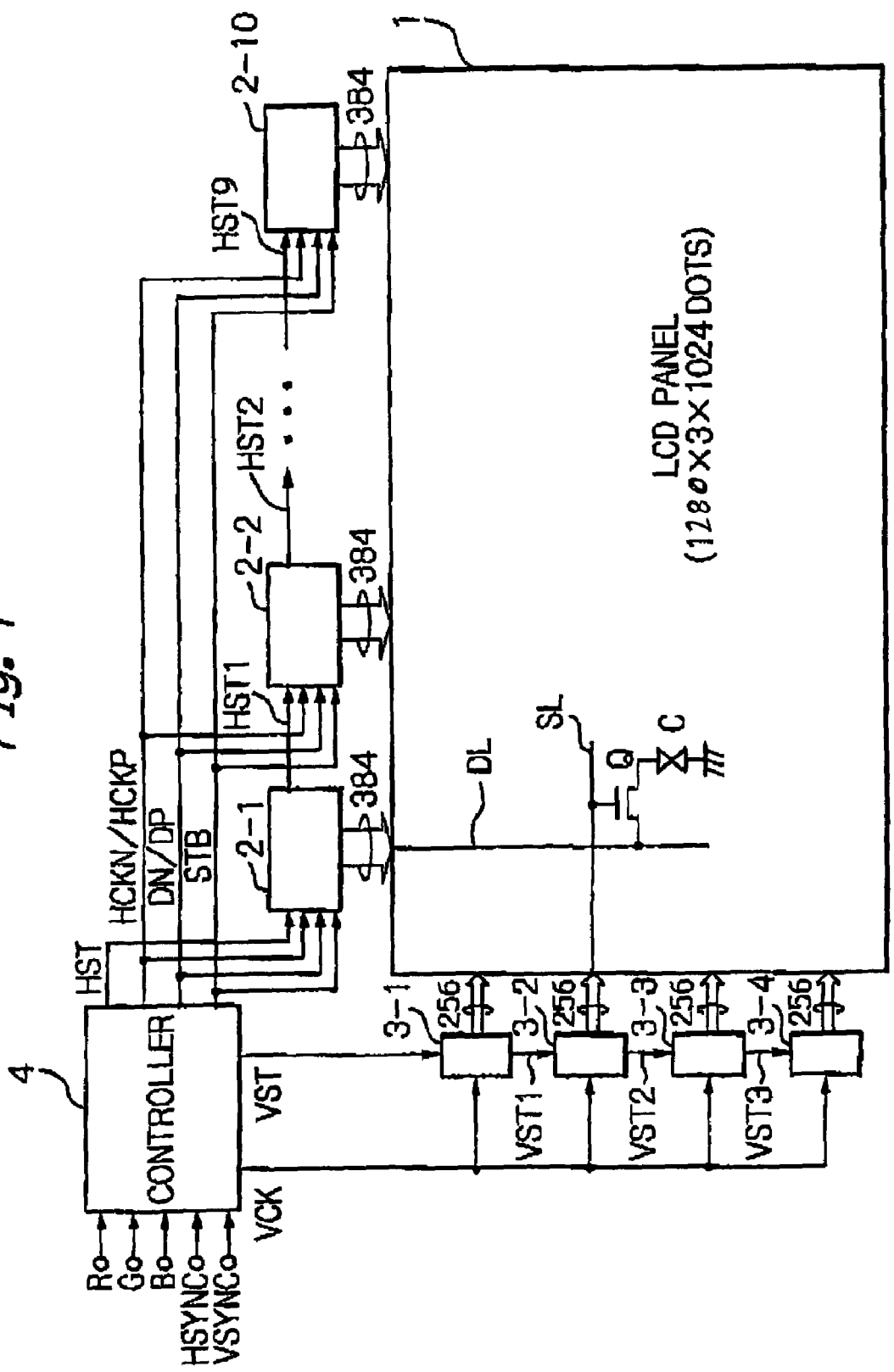
FIG. 1 is a block circuit diagram illustrating a first embodiment of the LCD apparatus according to the present invention.

In FIG. 1, which illustrates an embodiment of the LCD apparatus according to the present invention, reference numeral 1 designates an LCD panel having 1280×1024 pixels each formed by three color dots, i.e., R (red), G (green) and B (blue). Therefore, the LCD panel 1 includes 3932160 dots located at 3840 (=1028×3) data lines (or signal lines) DL and 1024 scan lines (or gate lines) SL. One dot is formed by one thin film transistor Q and one liquid crystal cell C. For example, if one dot is represented by 64 gradation voltages, one pixel is represented by 262144 (=64×64×64) colors, This LCD panel is called an SXGA.

In order to drive the 3840 data lines DL, ten data line drivers 2-1, 2-2, . . . , 2-10 each for driving 384 data lines are provided along a horizontal edge of the LCD panel 1. On the other hand, in order to drive the 1024 scan lines SL, four gate line drivers 3-1, 3-2, 3-3 and 3-4 each for driving 256 gate lines are provided along a vertical edge of the LCD panel 1.

A controller 4 receives color signals R, G and B, a horizontal synchronization signal HSYNC and a vertical synchronization signal VSYNC from a personal computer or the line using a low voltage differential signaling (LVDS) interface, and generates a horizontal start signal HST, differential horizontal clock signals HCKN/HCKP, video signals DN/DP, and a strobe signal STB for the data line drivers 2-1, 2-2, . . . , 2-10, a vertical start signal VST and a vertical clock signal VCK for the gate line drivers 3-1, 3-2, 3-3 and 3-4. In this case, the horizontal start signal HST, the strobe signal STB, the vertical start signal VST and the vertical clock signal VCK are of a CMOS level, while the differential horizontal clock signals HCKN/HCKP and the differential data signals DN/DP are of a small amplitude level.

The small amplitude differential signaling is known by reduced swing differential signaling (registered trademark "RSDS" of National Semiconductor Corporation), min-low voltage differential Signaling (trademark "min-LVDS" of Texas Instrument Corporation) or current mode advanced differential signaling (trademark "CIADS" of NEC Corporation).

In FIG. 1, the data line drivers 2-1, 2-2, . . . , 2-10 are arranged by a cascade connection method to pass the horizontal start signal HST therethrough in synchronization with the differential horizontal clock signals HCKN/HCKP. In this case, if a horizontal start signal output from the data line driver 2-1 is denoted by HST1, the horizontal start signal HST1 is supplied to the data line driver 2-2. Also, if a horizontal start signal output from the data line driver 2-2 is denoted by HST2, the horizontal start signal HST2 is supplied to the data line driver 2-3. Further, if a horizontal start signal output from the data line driver 2-9 is denoted by HST9, the horizontal start signal HST9 is supplied to the data line driver 2-10.

Also, in FIG. 1, the scan line drivers 3-1, 3-2, 3-3 and 3-4 are arranged by a cascade connection method to pass the vertical start signal VST therethrough in synchronization with the vertical clock signals VCK. In this case, if a vertical start signal output from the scan line driver 3-1 is denoted by VST1, the vertical start signal VST1 is supplied to the scan line driver 3-2. Also, if a vertical start signal output from the data line driver 3-2 is denoted by VST2, the vertical start signal VST2 is supplied to the scan line driver 3-3. Further, if a vertical start signal output from the scan line driver 3-3 is denoted by VST3, the vertical start signal VST3 is supplied to the scan line driver 3-4.

The operation of the LCD apparatus of FIG. 1 will now be briefly explained. A vertical start signal VST is shifted within the shift registers of each of the scan line drivers 3-1, 3-2, 3-3 and 3-4, one scan line is selected to turn ON all the thin film transistors Q connected thereto. On the other hand, a horizontal start signal HST is shifted within the shift registers of each of the data line drivers 2-1, 2-2, . . . , 2-10, video data of one scan line is latched. Then, the gradation voltages corresponding to the video data are applied by the strobe signal STB via the thin film transistors at the scan line to the liquid crystal cells C thereof. After that, the gradation voltages applied to the liquid crystal cells C are maintained until the next selecting operation is performed thereon.

Figure 2:
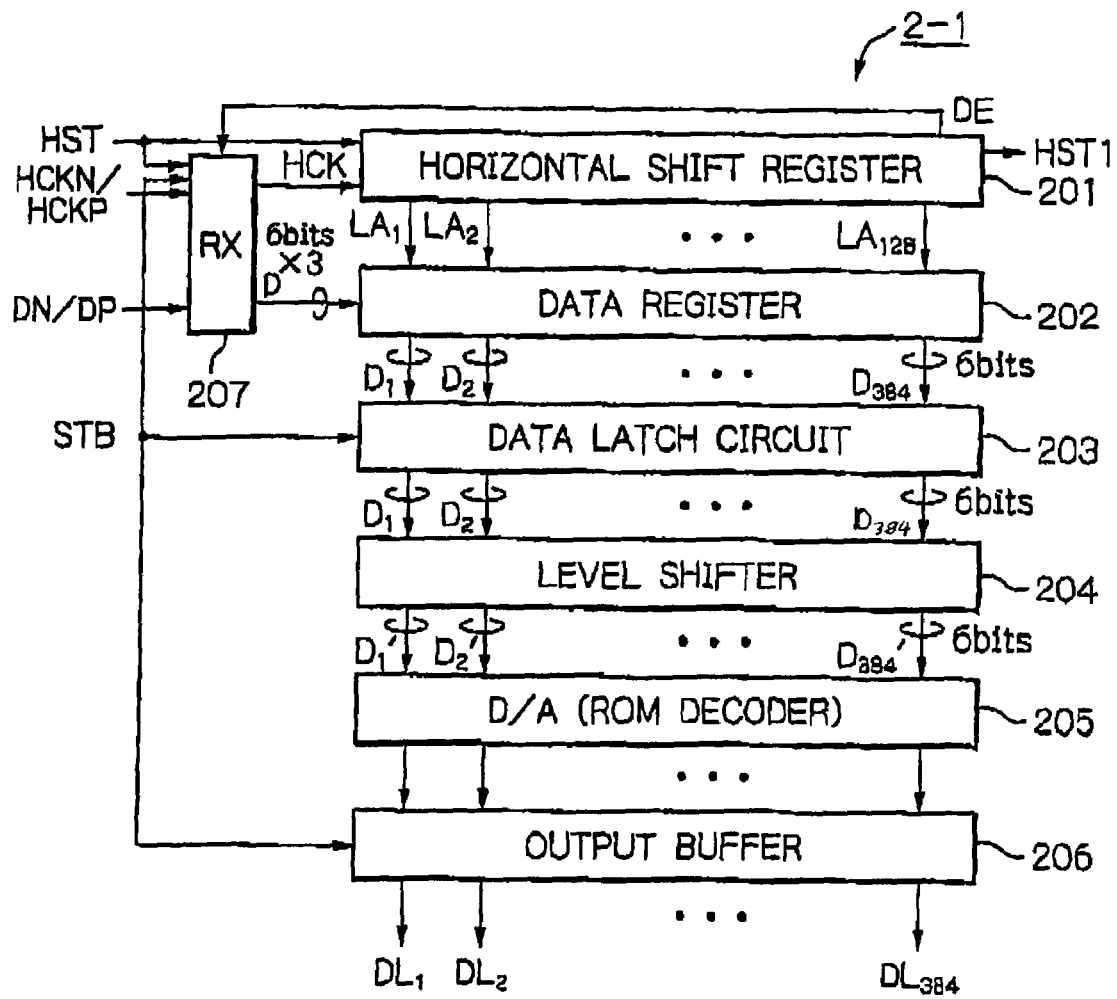
FIG. 2 is a detailed block circuit diagram of the data line driver of FIG. 1.

In FIG. 2, which is a detailed block circuit diagram of the data line driver 2-1 of FIG. 1, the data line driver 2-1 is constructed by a horizontal shift register 201, a data register, 202, a data latch circuit 203, a level shifter 204, a digital/analog (D/A) converter 205, and an output buffer 206 formed by voltage followers. Also, the data line driver 2-1 is constructed by a receiver 207 for receiving the differential horizontal clock signals HCKN/HCKP and the differential video signals DN/DP as well as the horizontal start signal HST, the strobe signal STB and a data end signal DE to convert the differential horizontal clock signals HCKN/HCKP and the differential video signal DN/DP of a small amplitude level into a horizontal clock signal HCO and video signals D of a CMOS level.

The horizontal shift register 201 shifts the horizontal start signal EST in synchronization with the horizontal clock signal HCK, to sequentially generate latch signals $LA_1$, $LA_2$, . . . , $LA_{128}$. The horizontal shift register 201 also generates the horizontal start signal HST1 for the next stage data line driver 2-2, and the data end signal DE which is delayed for a predetermined time period as compared with the horizontal start signal HST1.

The data register 202 latches the video signals D(18 bits) formed by red data (9)(6 bits), green data (G)(6 bits) and blue data (B)(6 bits) in synchronization with the latch signals $LA_1$, $LA_2$, . . . , $LA_{128}$, to generate video signals $D_1, D_2, \ldots , D_{384}$, respectively.

The data latch circuit 203 latches the video signals $D_1$, $D_2, \ldots , D_{384}$ of the data register 202 in synchronization with the strobe signal STB.

The level shifter 204 shifts the video signals $D_1, D_2, \ldots , D_{384}$ by a level shift amount $\Delta V$ applied to the liquid crystal of the LCD panel 1 to generate video signals $D_1', D_2', \ldots , D_{384}'$. That is, the level shift amount $\Delta V$ is a preset voltage to initiate the change of the transmittance of the liquid crystal.

The D/A converter 205 performs D/A conversions upon the shifted video signals $D_1', D_2', \ldots , D_{384}'$, using the multi-gradation voltages such as 64 gradation voltages to generate analog voltages which are applied via the output buffer 206 to data lines $DL_1, DL_2, \ldots , DL_{384}$, respectively.

The receiver 207 of FIG. 2 will be explained next with reference to FIG. 3.

Figure 3:
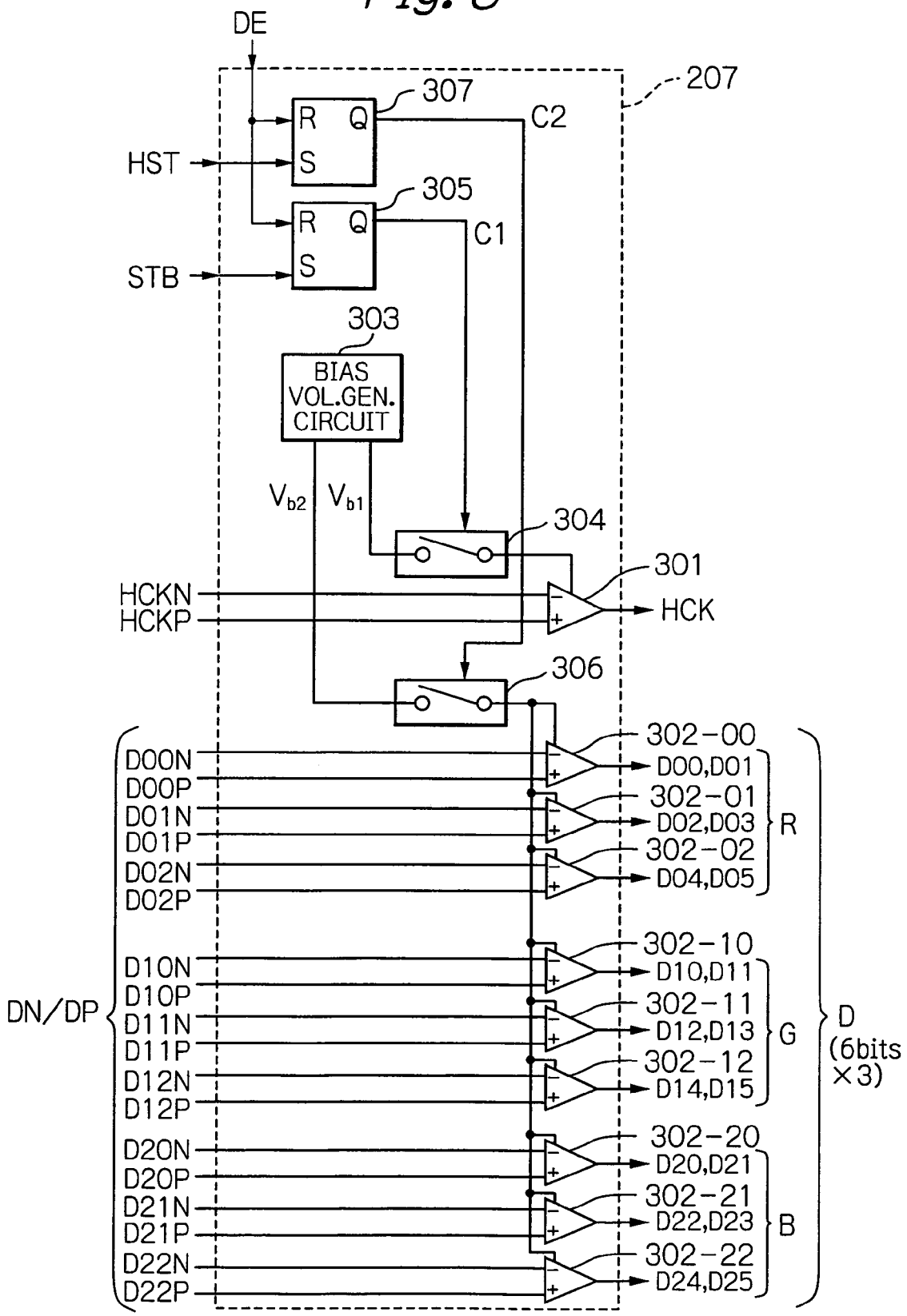
FIG. 3 is a detailed block circuit diagram of the receiver of FIG. 2.
Figure 4:
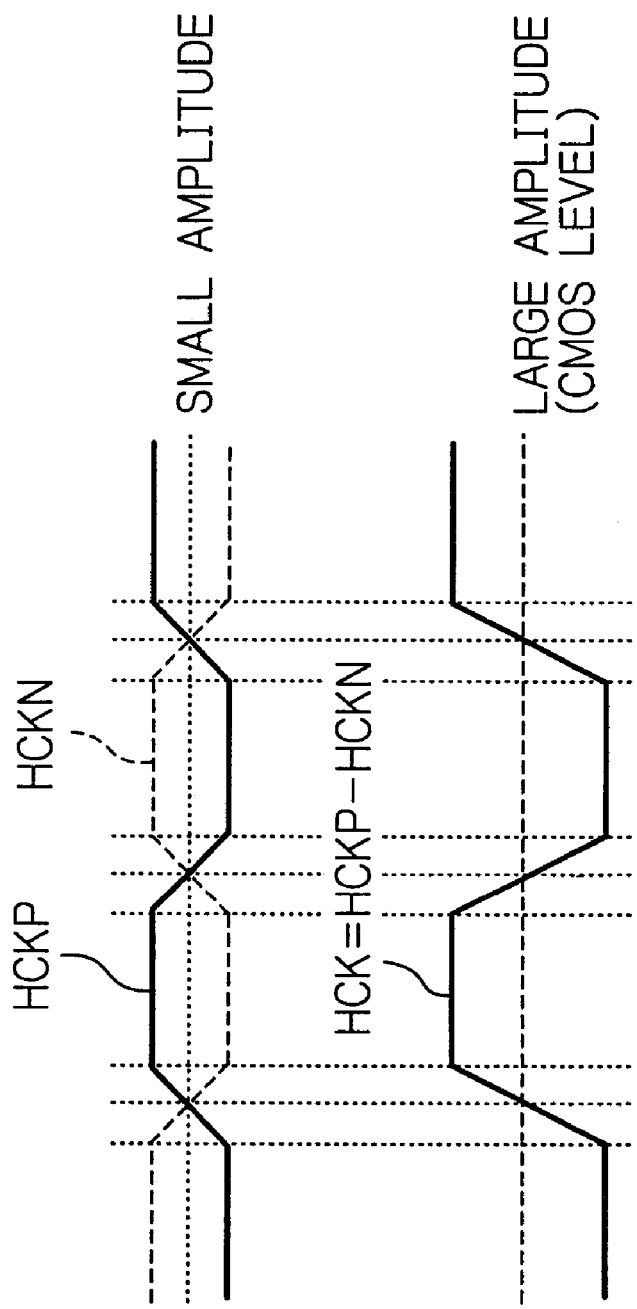
FIGS. 4A and 4B are timing diagrams for explaining the operation of one of the differential amplifiers of FIG. 3.

In FIG. 3, a clock signal receiver (differential amplifier) 301 amplifies the difference in voltage between the differential clock signals HCKN and HCKP of a small amplitude level as shown in FIG. 4A to generate the clock signal HCK of a CMOS level as shown in FIG. 4B. On the other hand, a data signal receiver (differential amplifier) 302-00 (302-01 and 302-02) amplifies the difference in voltage between differential red video signals D00N and D00P (D01N and D01P, D02N and D02P) of a small amplitude level to generate red video signals D00 and D01 (D02 and D03, D04 and D05) of a CMOS level. Also, a data signal receiver (differential amplifier) 302-10 (302-11 and 302-12) amplifies the difference in voltage between differential green video signals D10N and D10P (D11N and D11P, D12N and D12P) of a small amplitude level to generate green video signals D10 and D11 (D12 and D13, D14 and D15). Further, a data signal receiver (differential amplifier) 302-20 (302-21 and 302-22) amplifies the difference in voltage between differential blue video signal D20N and D20P (D21N and D21P, D22N and D22P) of a small amplitude level to generate blue video signals D20 and D21 (D22 and D23, D24 and D25).

To the differential amplifier 301 is applied a bias voltage $V_{b1}$ from a bias voltage generating circuit 303 via a switch 304 which is controlled by an RS flip-flop 305. On the other hand, to the differential amplifiers 302-00, 302-01, 302-02, 302-10, 302-11, 302-12, 302-20, 302-21 and 302-22 is applied a bias voltage $V_{b2}$ from the bias voltage generating circuit 303 via a switch 306 which is controlled by an RS flip-flop 307.

The RS flip-flop 305 is set by the strobe signal STB and reset by the data end signal DE. Therefore, a control signal C1 generated from the RS flip-flop 305 is high from a rising timing of the strobe signal STB to a rising timing of the data end signal DE, to turn ON the switch 304 so that the differential amplifier 301 is activated.

On the other hand, the RS flip-flop 307 is set by the horizontal start signal HST and reset by the data end signal DE. Therefore, a control signal C2 generated from the RS flip-flop 307 is high from a rising timing of the horizontal start signal HST to a rising timing of the data end signal DE, to turn ON the switch 306 so that the differential amplifiers 302-00, 302-01, 302-02, 302-10, 302-11, 302-12, 302-20, 302-21 and 302-22 are activated.

Figure 5:
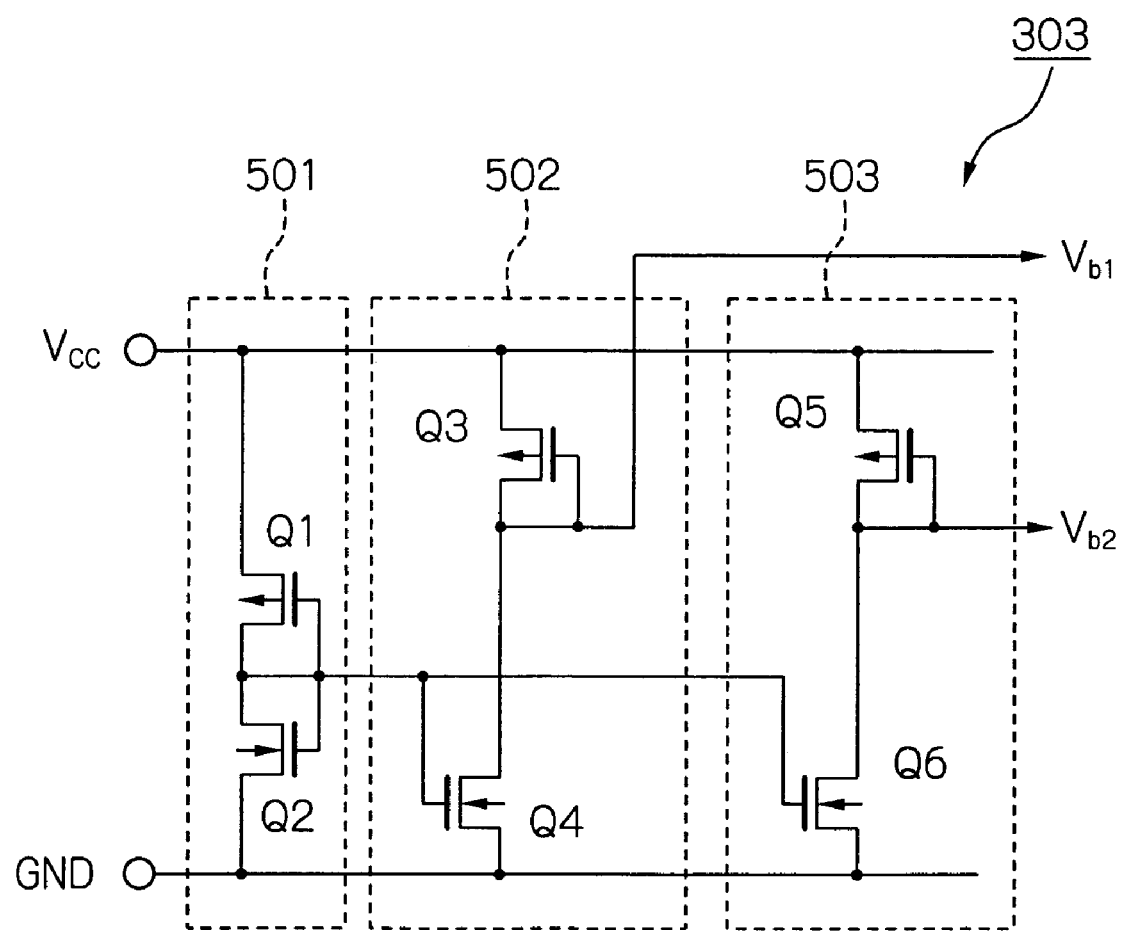
FIG. 5 is a circuit diagram of the bias voltage generating circuit of FIG. 3.

In FIG. 5, which is a detailed circuit diagram of the bias voltage generating circuit 303 of FIG. 3, the bias voltage generating circuit 303 is constructed by a bias current source 501, a bias voltage generating section 502 for the bias voltage $V_{b1}$ and a bias voltage generating section 503 for the bias voltage $V_{b2}$.

The bias current source 501 is formed by a diode-connected P-channel MOS transistor Q1 and a diode-connected N-channel HOS transistor Q2 connected in series between a power supply terminal $V_{cc}$ and a ground terminal GND.

The bias voltage generating section 502 is formed by a diode-connected P-channel MOS transistor Q3 and an N-channel Mos transistor Q4 connected in series between the power supply terminal $V_{cc}$ and the ground terminal GND. In this case, the gate of the N-channel MOS transistor Q4 is connected to the gate of the N-channel MOS transistor Q2, so that the N-channel transistors Q2 and Q4 form a current mirror circuit where a current flowing through the P-channel MOS transistor Q1 is defined by an input current and a current flowing through the N-channel MOS transistor Q4 is defined by an output current.

The bias voltage generating section 503 is formed by a diode-connected P-channel MOS transistor Q5 and an N-channel MOS transistor Q6 connected in series between the power supply terminal $V_{cc}$ and the ground terminal GND. In this case, the gate of the N-channel MOS transistor Q6 is connected to the gate of the N-channel MOS transistor Q2, so that the N-channel transistors Q2 and Q6 form a current mirror circuit where a current flowing through the P-channel MOS transistor Q1 is defined by an input current and a current flowing through the N-channel MOS transistor Q6 is defined by an output current.

Figure 6:
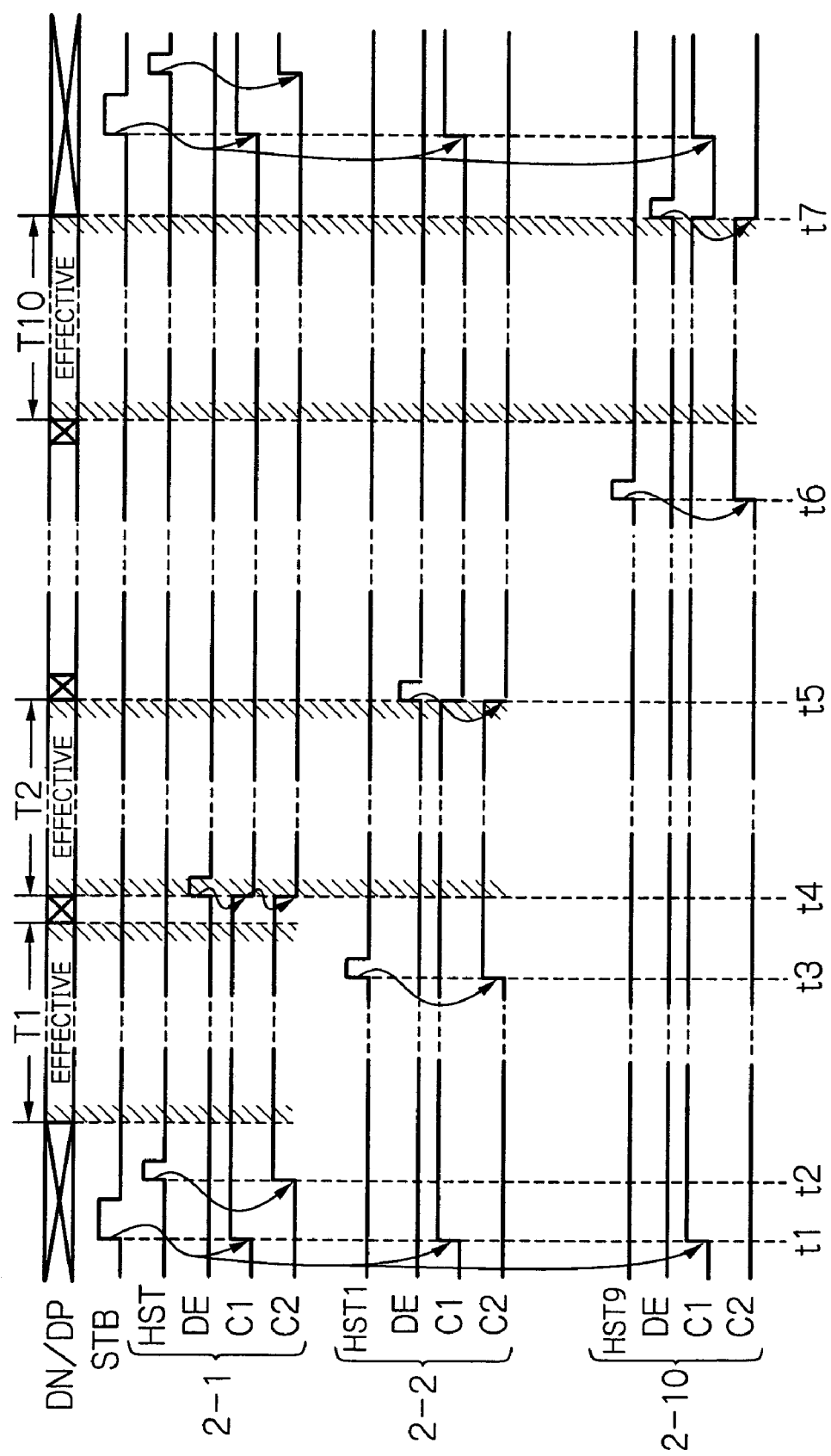
FIG. 6 is a timing diagram for explaining the operation of the LCD apparatus of FIGS. 1, 2 and 3.

The operation of the LCD apparatus of FIGS. 1, 2 and 3 will be explained next with reference to FIG. 6 where the differential data signals DN/DP are effective for the data line driver 2-1 during a time period T1, for the data line driver 2-2 during a time period T2, . . . , and for the data line driver 2-10 during a time period T10.

First, at time t1, when a strobe signal STB is generated from the controller 4, the RS flip-flop 305 of each of the data line drivers 2-1, 2-2, . . . , 2-10 is set, so that the control signal C1 of each of the data line drivers 2-1, 2-2, . . . , 2-10 is made high. As a result, the differential amplifier 301 of each of the data line drivers 2-1, 2-2, . . . , 2-10 is activated.

Next, at time t2, when a horizontal start signal HST is generated from the controller 4, the control signal C2 of the data line driver 2-1 is made high. As a result, the differential amplifiers 302-00, 302-01, 302-02, 302-10, 302-11, 302-12, 302-20, 302-21 and 302-22 of the data line driver 2-1 are activated.

Next, at time t3, the horizontal shift register 201 of the data line driver 2-1 generates a horizontal start signal HST1 which is received by the data line driver 2-2. Therefore, the control signal C2 of the data line driver 2-2 is made high. As a result, the differential amplifiers 302-00, 302-01, 302-02, 302-10, 302-11, 302-12, 302-20, 302-21 and 302-22 of the data line driver 2-2 are activated.

Next, at time t4, when a data end signal DE is generated from the horizontal shift register 201 of the data line driver 2-1, the RS flip-flops 305 and 307 of the data line driver 2-1 are reset, so that the control signals C1 and C2 of the data line driver 2-1 are both made low. As a result, the differential amplifiers 301, 302-00, 302-01, 302-02, 302-10, 302-11, 302-12, 302-20, 302-21 and 302-22 of the data line driver 2-1 are all deactivated.

Thus, in the data line driver 2-1, the time period of activation of the differential amplifiers 302-00, 302-01, 302-02, 302-10, 302-11, 302-12, 302-20, 302-21 and 302-22 defined by C2=high covers the effective time period T1 of the differential data signals DN/DP. Also, the time period of activation of the differential amplifier 301 defined by C1=high covers the time period of activation of the differential amplifiers 302-00, 302-01, 302-02, 302-10, 302-11, 302-12, 302-20, 302-21 and 302-22. Particularly, the start timing of activation of the differential amplifier 301 is sufficiently advanced as compared with that of the differential amplifiers 302-00, 302-01, 302-02, 302-10, 302-11, 302-12, 302-20, 302-21 and 302-22.

Next, at time t5, when a data end signal DE is generated from the horizontal shift register 201 of the data line driver 2-2, the RS flip-flops 305 and 307 of the data line driver 2-2 are reset, so that the control signals C1 and C2 of the data line driver 2-2 are both made low. As a result, the differential amplifiers 301, 302-00, 302-01, 302-02, 302-10, 302-11, 302-12, 302-20, 302-21 and 302-22 of the data line driver 2-2 are all deactivated.

Thus, in the data line driver 2-2, the time period of activation of the differential amplifiers 302-00, 302-01, 302-02, 302-10, 302-11, 302-12, 302-20, 302-21 and 302-22 defined by C2=high covers the effective time period T2 of the differential data signals DN/DP. Also, the time period of activation of the differential amplifier 301 defined by C1=high covers the time period of activation of the differential amplifiers 302-00, 302-01, 302-02, 302-10, 302-11, 302-12, 302-20, 302-21 and 302-22. Particularly, the start timing of activation of the differential amplifier 301 is sufficiently advanced as compared-with that of the differential amplifiers 302-00, 302-01, 302-02, 302-10, 302-11, 302-12, 302-20, 302-21 and 302-22.

Similarly, at time t6, the horizontal shift register 201 of the data line driver 2-9 generates a horizontal start signal HST9 which is received by the data line driver 2-10. Therefore, the control signal C2 of the data line driver 2-10 is made high. As a result, the differential amplifiers 302-00, 302-01, 302-02, 302-10, 302-11, 302-12, 302-20, 302-21 and 302-22 of the data line driver 2-10 are activated.

Next, at time t7, when a data end signal DE is generated from the horizontal shift register 201 of the data line driver 2-10, the RS flip-flops 305 and 307 of the data line driver 2-10 are reset, so that the control signals C1 and C2 of the data line driver 2-10 are both made low. As a result, the differential amplifiers 301, 302-00, 302-01, 302-02, 302-10, 302-11, 302-12, 302-20, 302-21 and 302-22 of the data line driver 2-10 are all deactivated.

Thus, in the data line driver 2-10, the time period of activation of the differential amplifiers 302-00, 302-01, 302-02, 302-10, 302-11, 302-12, 302-20, 302-21 and 302-22 defined by C2=high covers the effective time period T10 of the differential data signals DN/DP. Also, the time period of activation of the differential amplifier 301 defined by C1=high covers the time period of activation of the differential amplifiers 302-00, 302-01, 302-02, 302-10, 302-11, 302-12, 302-20, 302-21 and 302-22. Particularly, the start timing of activation of the differential amplifier 301 is sufficiently advanced as compared with that of the differential amplifiers 302-00, 302-01, 302-02, 302-10, 302-11, 302-12, 302-20, 302-21 and 302-22.

Note that the present invention can be applied to other apparatuses than LCD apparatuses.

As explained hereinabove, the restoration from deactivation to activation of the differential amplifiers for the differential data signals are carried out sufficiently before the restoration from deactivation to activation of the differential amplifier for the differential clock signals.

The invention claimed is:

1. A semiconductor apparatus comprising:
   a shift register adapted to pass a start signal therethrough in synchronization with a clock signal of a large amplitude level to sequentially generate a plurality of latch signals;
   a data register adapted to latch sequential data signals of the large amplitude level in synchronization with said latch signals;
   a data latch circuit adapted to latch all said sequential data signals latched in said data register in synchronization with a strobe signal; and
   a receiver connected to said shift register and said data register, said receiver adapted to convert differential clock signals of a small amplitude level into said clock signal of the large amplitude level from a timing of generation of said strobe signal to a timing of completion of latching all said sequential data signals in said data register, and transmit said clock signal of the large amplitude level to said shift register, and adapted to convert differential data signals of the small amplitude level into said sequential data signals from a timing of generation of said start signal to the timing of completion of latching all said sequential data signals in said data register and transmit said sequential data signals to said data register.

2. The apparatus as set forth in claim 1, wherein said receiver comprises:
   a clock signal receiver adapted to amplify the difference in voltage between said differential clock signals to generate said clock signal;
   a data signal receiver adapted to amplify the difference in voltage between said differential data signals to generate said sequential data signal;
   a first switch connected to said clock signal receiver and adapted to apply a first bias voltage to said clock signal receiver to activate said clock signal receiver;
   a second switch connected to said data signal receiver and adapted to apply a second bias voltage to said data signal receiver to activate said data signal receiver;
   a first control circuit connected to said first switch and adapted to turn ON said first switch from the timing of generation of said strobe signal to the timing of completion of latching all said sequential data signals; and
   a second control circuit connected to said second switch and adapted to turn ON said second switch from the generation of said start signal to the timing of completion of latching all said sequential data signals.

3. The apparatus as set forth in claim 1, being a data signal driver adapted to drive data lines of a liquid crystal display apparatus.

4. A semiconductor apparatus comprising a plurality of units connected to each other by a cascade connection and adapted to pass a start signal therethrough, each of said units comprising:
   a shift register adapted to pass said start signal therethrough in synchronization with a clock signal of a large amplitude level to sequentially generate a plurality of latch signals;
   a data register adapted to latch sequential data signals of the large amplitude level in synchronization with said latch signals;
   a data latch circuit adapted to latch all said sequential data signals latched in said data register in synchronization with a strobe signal; and
   a receiver connected to said shift register and said data register, said receiver adapted to convert differential clock signals of a small amplitude level into said clock signal of the large amplitude level from a timing of generation of said strobe signal to a timing of completion of latching all said sequential data signals in said data register, and transmit said clock signal of the large amplitude level to said shift register, and adapted to convert differential data signals of the small amplitude level into said sequential data signals from a timing of generation of said start signal to the timing of completion of latching all said sequential data signals in said data register and transmit said sequential data signals to said data register.

5. The apparatus as set forth in claim 4, wherein said receiver comprises:
   a clock signal receiver adapted to amplify the difference in voltage between said differential clock signals to generate said clock signal;
   a data signal receiver adapted to amplify the difference in voltage between said differential data signals to generate said sequential data signal;
   a first switch connected to said clock signal receiver and adapted to apply a first bias voltage to said clock signal receiver to activate said clock signal receiver;
   a second switch connected to said data signal receiver and adapted to apply a second bias voltage to said data signal receiver to activate said data signal receiver;
   a first control circuit connected to said first switch and adapted to turn ON said first switch from the timing of generation of said strobe signal to the timing of completion of latching all said sequential data signals; and
   a second control circuit connected to said second switch and adapted to turn ON said second switch from the generation of said start signal to the timing of completion of latching all said sequential data signals.

6. The apparatus as set forth in claim 4, wherein each of said units is a data signal driver adapted to drive data lines of a liquid crystal display apparatus.

7. A receiver of a source driver, comprising:
   a first receiving circuit receiving a clock signal;
   a plurality of second receiving circuits each receiving a data signal;
   a bias circuit for producing first and second bias voltages;
   a first switch coupled between said bias circuit and said first receiving circuit and controlled by a first control signal to apply said first bias voltage to said first receiving circuit; and
   a second switch coupled between said bias circuit and said second receiving circuits and controlled by a second control signal different from said first control signal to apply said second bias voltage to said second receiving circuits.

* * * * *